(12) United States Patent
Hu

(10) Patent No.: US 8,694,023 B2
(45) Date of Patent: Apr. 8, 2014

(54) LOCATION MANAGEMENT OF STATIC/LOW SPEED MOBILE DEVICES

(75) Inventor: Fanglong Hu, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/637,322

(22) PCT Filed: Nov. 14, 2011

(86) PCT No.: PCT/CN2011/082141
§ 371 (c)(1),
(2), (4) Date: Sep. 25, 2012

(87) PCT Pub. No.: WO2013/071470
PCT Pub. Date: May 23, 2013

(65) Prior Publication Data
US 2013/0122927 A1    May 16, 2013

(51) Int. Cl.
*H04W 24/00*    (2009.01)

(52) U.S. Cl.
USPC ............... 455/456.1; 455/404.2; 455/433; 455/435.1; 455/440; 455/456.2; 455/456.3; 455/456.4; 455/456.5; 455/456.6

(58) Field of Classification Search
USPC ............ 455/404.2, 433, 435.1, 440, 455/456.1–456.6
See application file for complete search history.

(56) References Cited

U.S. PATENT DOCUMENTS

| | | | |
|---|---|---|---|
| 6,049,715 A * | 4/2000 | Willhoff et al. | 455/436 |
| 6,192,259 B1 * | 2/2001 | Hayashi | 455/575.1 |
| 6,272,315 B1 * | 8/2001 | Chang et al. | 455/13.1 |
| 7,764,231 B1 | 7/2010 | Karr et al. | |
| 8,457,038 B1 * | 6/2013 | Xue et al. | 455/441 |
| 2001/0034232 A1 * | 10/2001 | Kuwahara | 455/435 |
| 2004/0224682 A1 * | 11/2004 | Kang | 455/433 |
| 2009/0156201 A1 * | 6/2009 | Pudney et al. | 455/426.1 |
| 2010/0309807 A1 * | 12/2010 | Rautiainen | 370/252 |

FOREIGN PATENT DOCUMENTS

| | | |
|---|---|---|
| CN | 101895858 A | 11/2010 |
| CN | 102083172 A | 6/2011 |
| CN | 102238525 A | 11/2011 |
| WO | 2011/084011 A2 | 7/2011 |

OTHER PUBLICATIONS

International Search Report dated Aug. 16, 2012 as received in application No. PCT/CN2011/082141.
Written Opinion of the International Searching Authority dated Aug. 16, 2012 as received in application No. PCT/CN2011/082141.

* cited by examiner

*Primary Examiner* — Rafael Pérez-Gutiérrez
*Assistant Examiner* — Thai Vu
(74) *Attorney, Agent, or Firm* — Maschoff Brennan

(57) ABSTRACT

In some examples, a method of tracking device location in a communication network is described. The method may include, detecting at a Machine Type Communication (MTC) device, location indicia from one or more access points (APs) in a vicinity of the MTC device. The method may also include determining, based on the detected location indicia, that a current location of the MTC device is different than a preceding location of the MTC device. The method may also include reporting the detected location indicia to a network end in the communication network. The network end may be configured to update location information of the MTC device in response to receiving the detected location indicia.

24 Claims, 3 Drawing Sheets

US 8,694,023 B2

LOCATION MANAGEMENT OF STATIC/LOW SPEED MOBILE DEVICES

BACKGROUND

Unless otherwise indicated herein, the materials described herein are not prior art to the claims in the present application and are not admitted to be prior art by inclusion in this section.

Some communication networks implement Machine-to-Machine (M2M) communication, also known as Machine Type Communication (MTC), in which machines communicate directly with one another without any human intervention or with only limited human intervention. MTC devices can be used in a wide range of applications including security applications, transportation applications, health care applications, utilities applications, manufacturing applications and facility management applications. As a specific example, MTC devices may be installed in ammeters or other utility meters to autonomously report utility usage for, e.g., provisioning and billing of utilities.

Many MTC applications implement a relatively large number of MTC devices. For instance, a power company serving a geographical area may install MTC devices on many or all of the power meters at the residences, business, and/or other facilities within the geographical area. Given the wide range of MTC applications and large numbers of MTC devices that may be implemented for a given MTC application, MTC devices can add a significant signaling burden to the communication networks in which they are implemented.

For example, many communication networks include a location management mechanism in which an MTC device is periodically called to detect a location of the MTC device and determine whether to update stored location information for the MTC device. The MTC device is called even when the location of the MTC device has not changed, thereby adding unnecessary signaling overhead to the communication network.

SUMMARY

Techniques described herein generally relate to location management of static and/or low speed mobile devices in a communication network.

In some examples, a method of tracking device location in a communication network is described. The method may include, detecting at a Machine Type Communication (MTC) device, location indicia from one or more access points (APs) in a vicinity of the MTC device. The method may also include determining, based on the detected location indicia, that a current location of the MTC device is different than a preceding location of the MTC device. The method may also include reporting the detected location indicia to a network end in the communication network. The network end may be configured to update location information of the MTC device in response to receiving the detected location indicia.

In some examples, a computer-readable storage medium having computer-executable instructions stored thereon that are executable by a computing device to perform operations is described. The operations may include detecting location indicia from one or more access points (APs) in a vicinity of an MTC device. The operations may also include determining, based on the detected location indicia, that a current location of the MTC device is different than a preceding location of the MTC device. The operations may also include reporting the detected location indicia to a network end in the communication network. The network end may be configured to update location information of the MTC device in response to receiving the detected location indicia.

In some examples, a communication network is described. The communication network may include a network end and an MTC device. The MTC device may be configured to detect variations in a current location of the MTC device. The MTC device may also be configured to inform the network end to update a location of the MTC device stored by the network end in response to detecting a variation in the current location.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
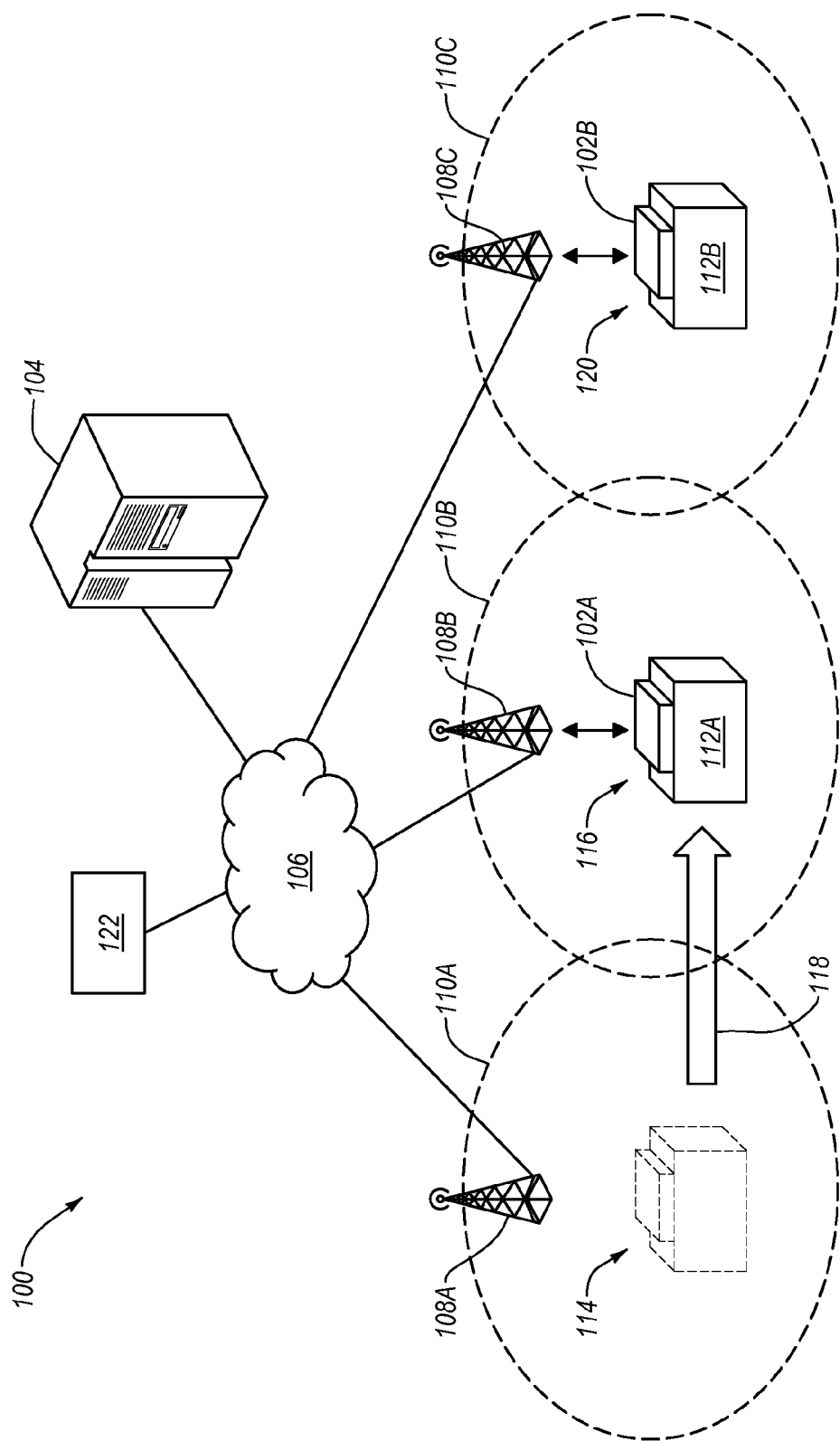
FIG. 1 is a block diagram of an example communication network including an MTC device and a network end.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein generally relate to location management of static and/or low speed mobile devices, such as MTC devices in a communication network that also includes a network end. Each MTC device may be configured to detect variations in a current location of the MTC device and to inform the network end to update a location of the MTC device stored by the network end in response to detecting a variation in the current location.

For example, the MTC device may be configured to detect location indicia, such as received signal strength of signals received from one or more APs, to determine whether the current location of the MTC device is different than a preceding location of the MTC device. The MTC device may determine that its current location is different if, for instance, the received signal strength of the APs changes significantly. In response to determining that the current location is different, the MTC device may report the detected location indicia to the network end. The network end may then use the location indicia to update location information of the MTC device stored by the network end.

FIG. 1 is a block diagram of an example communication network 100 including one or more MTC devices 102A, 102B (collectively hereinafter "MTC devices 102") and a network end 104, arranged in accordance with at least some embodiments described herein. The communication network 100 may additionally include a backend network 106 and one or more APs 108A, 108B, 108C (collectively hereinafter "APs 108"), each having a corresponding coverage area 110A, 110B, 110C (collectively hereinafter "coverage areas 110"). Additionally, each of the MTC devices 102 may be attached to or included in a corresponding carrier 112A, 112B (collectively hereinafter "carriers 112").

Although not required, in some embodiments, the communication network implements the $3^{rd}$ Generation Partnership Project (3GPP) Long Term Evolution (LTE) wireless communication standard. In other embodiments, the communication network 100 may implement the Global System for Mobile Communications (GSM) wireless communication standard, the Universal Mobile Telecommunications System (UMTS) wireless communication standard, or another wireless communication standard.

In the illustrated embodiment, the communication network 100 implements M2M communication in which machines (e.g., MTC devices 102, APs 108) communicate directly with one another without any human intervention or with only limited human intervention. This is in contrast to Human-to-Human communication in which humans use the communication network 100 to communicate with each other. In some embodiments, M2M communication is synonymous with MTC.

Each of the MTC devices 102 may be configured to reply to requests for data contained within the MTC devices 102; such requests may be received from another component within the communication network 100, such as the network end 104. Alternately or additionally, each of the MTC devices 102 may be configured to autonomously transmit data contained within the MTC devices 102 to another network component within the communication network 100. In some embodiments, the MTC devices 102 are stationary, move infrequently, or move only within a certain region. For instance, in FIG. 1, the MTC device 102A is shown as having moved from a first location 114 within the coverage area 110A of the AP 108A to a second location 116 within the coverage area 110B of the AP 108B, as indicated by the arrow 118, while the MTC device 102B remains at a third location 120 within the coverage area 110C of the AP 108C.

As previously mentioned, each of the MTC devices 102 may be attached to or included in a carrier 112. Each carrier 112 may include, but is not limited to, an intelligent ammeter, a security monitor, a parking meter, a vending machine, an elevator, a pump, a car, a container, a pet, or other carrier. Data associated with each carrier 112 can be autonomously collected and reported by the corresponding MTC device 102 to a corresponding MTC server 122 through the communication network 100 for any one of numerous MTC applications depending on the carriers 112 and the data collected by the MTC devices 102. Examples of MTC applications include, but are not limited to, surveillance systems, fleet or order management, power metering, and many other applications.

In some embodiments, each of the MTC devices 102 is configured to detect variations in a current location of the MTC device 102 and to inform the network end 104 to update a location of the MTC device 102 stored by the network end 104 in response to detecting a variation in the current location. For instance, each of the MTC devices 102 may be configured to detect location indicia to determine whether the current location of the MTC device 102 is different than a preceding location of the MTC device 102. If a change in location indicia is detected, the location indicia may be reported to the network end 104 to update the location of the MTC device 102.

The detected location indicia may include, for each of the one or more APs 108 in the vicinity of the MTC device 102, at least one of a serial number of the AP 108, a received signal strength of a signal received from the AP 108, or an incoming angle of the signal received from the AP 108. Any changes in the detected location indicia over time may be indicative that the current location of the MTC device 102 is different than a preceding location of the MTC device 102. For example, if a received signal strength detected at the MTC device 102 for each of the APs 108 at time $t_1$ is 6 dBm, −3 dBm and −20 dBm, respectively, and the detected received signal strength for each of the APs 108 at time $t_2$ is −10 dBm, 6 dBm and −10 dBm, respectively, the change in the received signal strengths may be indicative that the MTC device 102 moved from the first location 114 to the second location 116. By reporting the received signal strengths detected at time $t_2$, together with other location indicia such as serial numbers of each of the APs 108 to the network end 104, the network end 104 can use the reported location indicia to determine the current location, e.g., the second location 116, of the MTC device 102A and update location information for the MTC device 102A accordingly.

The network end 104 may be configured to track locations of the MTC devices 102. By tracking locations of the MTC devices 102, signaling overhead can be reduced when paging one of the MTC devices 102 for data by paging the MTC device 102 through a single one of the APs 108 corresponding to the known location of the MTC device 102, compared to paging the MTC device 102 through multiple APs 108 when the location of the MTC device is unknown.

Although not required, in some embodiments in which the communication network implements the 3GPP LTE wireless communication standard, the network end 104 may include a Mobility Management Entity (MME). Alternately, in some embodiments in which the communication network implements the GSM or UMTS wireless communication standards, the network end 104 may include one or more components, such as a mobile switching center (MSC) and/or a visitor location register (VLR).

Alternately or additionally, the network end 104 may be configured to update location information of the MTC devices 102 in response to receiving location indicia from the MTC devices 102. Thus, rather than periodically calling the MTC devices 102 to determine their locations, some embodiments described herein reduce signaling overhead by instead allowing the MTC devices 102 to initiate location updates in response to the MTC devices 102 detecting location changes.

Each of the APs 108 may include, but is not limited to, a base station, an evolved Node B (eNB), an IEEE 802.16 access point, an IEEE 802.11 access point, or other access point. Moreover, each of the APs 108 may be configured to communicate wirelessly with the MTC devices 102 that are present within the corresponding coverage area 110 of the AP 108. Further, each of the APs 108, together with the backend network 106, may be configured to facilitate communication between the MTC devices 102 and the network end 104.

At any given time, each of the MTC devices 102 may be configured to communicate with the network end 104, the MTC server 122, or other components through a single one of the APs 108. The particular AP 108 through which the MTC device 102 communicates may be referred to as a "serving AP" for that MTC device 102. The serving AP for each MTC device 102 is typically the AP 108 in whose coverage area 110 the MTC device 102 is located, and may change over time.

For instance, the serving AP for the MTC device 102A at time $t_1$ when the MTC device 102A is at the first location 114 within the coverage area 110A may be the AP 108A, while the serving AP for the MTC device 102A at time $t_2$ when the MTC device 102A is at the second location 116 within the coverage area 110B may be the AP 108B.

While the serving AP may facilitate communication for a given MTC device 102, the MTC device 102 may also be able to receive signals from other APs 108 within a vicinity of the MTC device 102, even though the MTC device 102 may not necessarily be in the coverage areas 110 of any of the other APs 108. Of course, in some cases, the MTC device 102 may be in a location with overlapping coverage areas 110, but only one of the APs 108 will be the serving AP at a given time. As described herein, an AP 108 is in the "vicinity" of an MTC device 102 if the MTC device 102 is able to detect signals from the AP 108. An AP 108 in the vicinity of an MTC device 102 that is not the serving AP for the MTC device 102 at a given time may be referred to herein as a "candidate AP", e.g., a candidate to become the serving AP.

The backend network 106 may include an internetwork formed between the APs 108 and the network end 104 by one or more logical and physical connections. Alternately or additionally, the backend network 106 may include the MTC server 122 that requests and utilizes data from the MTC devices 102.

Figure 2:
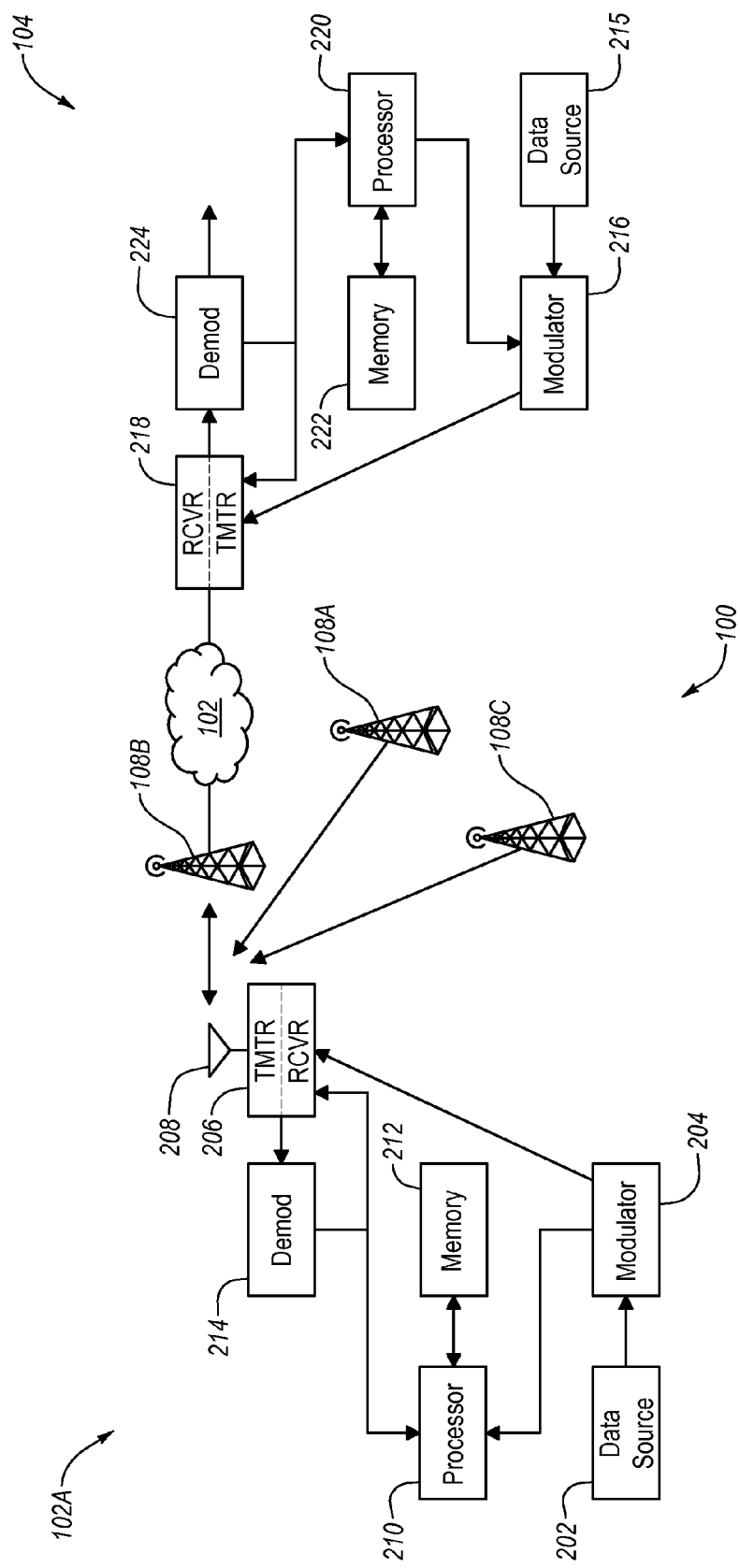
FIG. 2 is a block diagram illustrating some components of the MTC device and the network end of FIG. 1.

FIG. 2 is a block diagram illustrating some components of the MTC device 102A and of the network end 104 in the communication network 100 of FIG. 1, arranged in accordance with at least some embodiments described herein. Each of the MTC devices 102 of FIG. 1, including the MTC device 102B, may be similarly configured as the MTC device 102A depicted in FIG. 2. While the components and configuration of the MTC device 102A and the network end 104 depicted in FIG. 2 will be described in some detail, the components and configuration of FIG. 2 are provided by way of example only. In other embodiments, one or both of the MTC device 102A and the network end 104 may have more, fewer, or different components and/or a different configuration than illustrated in FIG. 2.

In the illustrated embodiment, the MTC device 102A may include, for example, a data source 202, a modulator 204, one or more transceivers 206, one or more antennas 208, a processor 210, a memory or other computer-readable storage medium 212, and a demodulator (Demod) 214. The transceiver 206 may include a transmitter (TMTR) and a receiver (RCVR).

Alternately or additionally, the network end 104 may include, for instance, a data source 215, a modulator 216, a transceiver 218, a processor 220, a memory 222, and a demodulator (Demod) 224. The transceiver 218 may include a transmitter (TMTR) and a receiver (RCVR).

FIG. 2 additionally illustrates the backend network 102 and the AP 108B, both of which may facilitate communication between the MTC device 102A and the network end 104 at a given time, such as the time $t_2$. More generally, any one of the APs 108 of FIG. 1 may cooperate with the network end 102 to facilitate communication between the MTC device 102A and the network end 104, depending on the location of the MTC device 102A. The AP 108B is illustrated in FIG. 2 as the serving AP for the MTC device 102A at time $t_2$ when the MTC device 102A is at the second location 116 (FIG. 1), and may be referred to as the "serving AP 108B" for the MTC device 102A. The APs 108A, 108C are also illustrated in FIG. 2 as being in the vicinity of the MTC device 102A and may be referred to as "candidate APs 108A, 108C" for the MTC device 102A.

An example embodiment of operation of the components of the MTC device 102A and the network end 104 that are depicted in FIG. 2 will now be described. At the MTC device 102A, data may be provided from the data source 202 to the modulator 204. The data may be received from or relate to the carrier 112A (FIG. 1) associated with the MTC device 102A. Alternately or additionally, the data may include location indication received by the MTC device 102A from the APs 108. The modulator 204 may format, code and symbol map the data based on a particular modulation scheme to generate a modulation signal that may be provided to the transmitter (TMTR) of the transceiver 206.

The data rate, coding, and modulation for the data may be determined by the processor 210 executing computer-executable instructions stored on the memory 212. Alternately or additionally, the processor 210 may execute computer-executable instructions stored on the memory 212 or other location that are effective to cause the MTC device 102A to perform one or more of the other operations described herein, such as detection location indicia from the APs 108, determining that a current location of the MTC device 102A is different than a preceding location of the MTC device 102A based on the detected location indicia, and reporting the detected location indicia to the network end 104. The memory 212 or other computer-readable storage medium accessible to the MTC device 102A may store computer-executable instructions such as program code, as well as data, and/or other information used by the processor 210 or other components of the MTC device 102A.

The transceiver 206 may receive and process the modulation signal to provide one or more analog signals, and may further condition (e.g., amplify, filter, and/or upconvert) the analog signals to provide a modulated signal suitable for transmission over one or more channels available for communication between the MTC device 102A and the serving AP 108B. Modulated signals from the transceiver 206 are then transmitted from the antenna 208.

The serving AP 108B receives and processes the transmitted modulated signals for transmission through the backend network 102 to the network end 104.

At the network end 104, the signals received through the backend network 102 are received at the transceiver 218. In the illustrated embodiment, the network end 104 may have a hardwired connection to the backend network 102 such that an antenna is not used to receive the signals. The transceiver 218 may condition (e.g., filter, amplify, and/or downconvert) a respective received signal, digitize the conditioned signal to provide samples, and further process the samples to provide a corresponding "received" symbol stream. The "received" symbol stream may be demodulated and decoded by the demodulator 224 to recover the data from the MTC device 102A. The processing by the transceiver 218 and demodulator 224 may be complementary to that performed in the backend network 102 and/or by the serving AP 108B.

The processor 220 may execute computer-executable instructions stored on the memory 222 or other location that are effective to cause the network end 104 to perform one or more of the operations described herein, such as storing location information for the MTC devices 102 (FIG. 1), receiving detected location indicia from the MTC device 102A (or other MTC devices 102), and based on the detected location indicia, determining the current location of the MTC device 102A and updating location information for the MTC device 102A accordingly. The memory 222 or other computer-readable storage medium accessible to the network end 104 may store computer executable instructions such as program code, as well as location data for the MTC devices 102 and/or other information used by the processor 220 or other components of the network end 104.

The data source 215, the modulator 216, and the transceiver 218 of the network end 104 permit the network end 104 to transmit data, such as location information for the MTC device 102A, to the MTC server 122 (FIG. 1) or other component to permit the MTC server 122 or other component to page the MTC device 102A through the serving AP 108B, rather than paging the MTC device 102A through multiple APs 108 and unnecessarily adding signal overhead to the communication network 100.

The transceiver 206 and the demodulator 214 of the MTC device 102A permit the MTC device 102A to receive pages including requests for data and/or other data from the MTC server 122 (FIG. 1) or other components in much the same way that data may be received by the network end 104. Moreover, the processor 210 may receive signals from the transceiver 206 and/or demodulator 214, which signals may represent location indicia received from the serving AP 108B and/or one or more of the candidate APs 108A, 108C. Based on the location indicia, the processor 210 can determine whether the current location of the MTC device 102A is the same or different than a previous location of the MTC device 102A. If the location indicia indicate a change in location, the processor 210 can report the location indicia to the network end 104 in the manner already described.

Although FIG. 2 illustrates the MTC device 102A as including a single antenna 208, in other embodiments the MTC device 102A may include multiple antennas. In these and other embodiments, the location indicia detected by the MTC device 102A may include, for instance, an incoming angle of a signal received from each of the APs 108.

Figure 3:
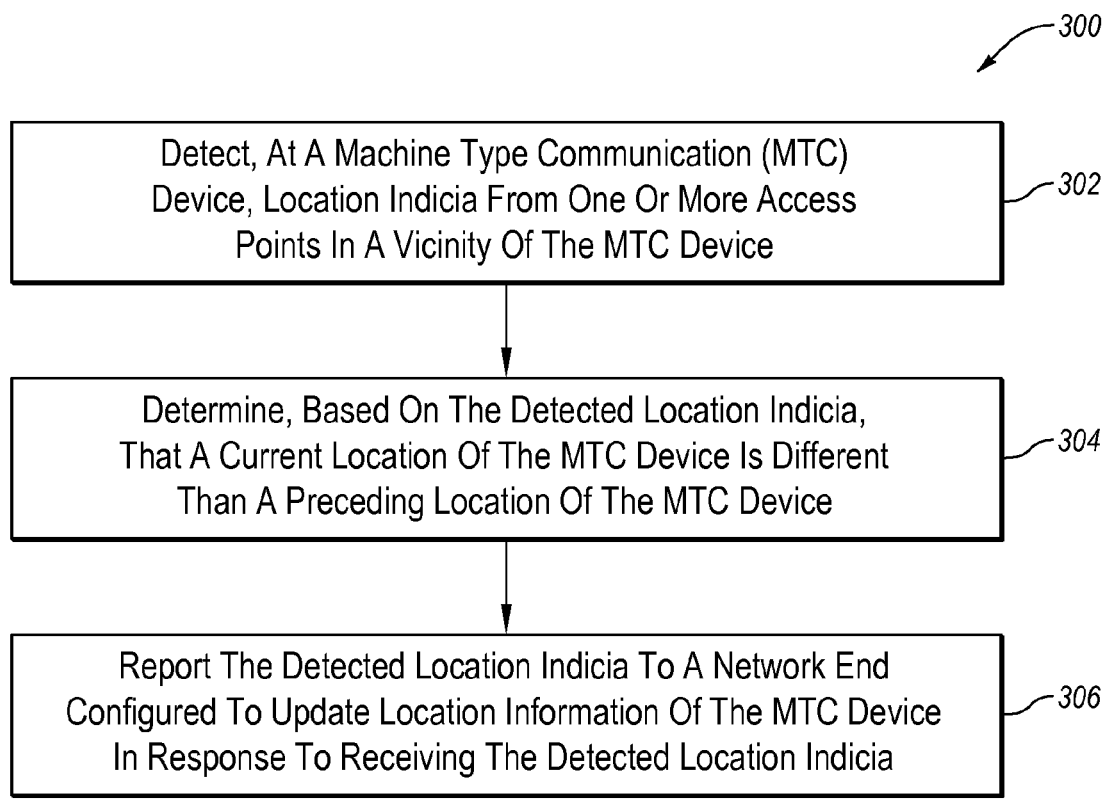
FIG. 3 shows an example flow diagram of a method of tracking device location in a communication network, all arranged in accordance with at least some embodiments described herein.

FIG. 3 shows an example flow diagram of a method 300 of tracking device location in a communication network, arranged in accordance with at least some embodiments described herein. The method 300 may be performed in whole or in part by, e.g., any one of the MTC devices 102 of FIG. 1. The method 300 includes various operations, functions or actions as illustrated by one or more of blocks 302, 304 and/or 306. The method 300 may begin at block 302.

In block 302, location indicia from one or more APs in a vicinity of an MTC device is detected at the MTC device. The location indicia may include, for each of the one or more APs in the vicinity of the MTC device, at least one of a serial number of the AP, a received signal strength of a signal received from the AP, or an incoming angle of the signal received from the AP.

In some embodiments, the MTC device periodically detects location indicia from one or more APs in the vicinity of the MTC device with a predetermined frequency. In these and other embodiments, the predetermined frequency may be set for the speed of the MTC device. For instance, the predetermined frequency may be set differently depending on whether the MTC device is a static MTC device configured to remain at a fixed location, such as the MTC device 102B of FIG. 1, or a low speed mobile MTC device configured to change locations during the long term. If the MTC device is a static MTC device, the predetermined frequency may be a first predetermined frequency, while the predetermined frequency may be a second predetermined frequency higher than the first predetermined frequency if the MTC device is a low speed mobile MTC device.

Returning to FIG. 3, block 302 may be followed by block 304.

In block 304, it is determined, based on the detected location indicia, that a current location of the MTC device is different than a preceding location of the MTC device. In some embodiments, determining, based on the detected location indicia, that a current location of the MTC device is different than a preceding location of the MTC device can include determining that a received signal strength of a signal received from at least one of one or more candidate APs is above a first predetermined threshold for a predetermined time period, and/or determining that a received signal strength of a signal received from a serving AP is below a second predetermined threshold for the predetermined time period. For instance, the first predetermined threshold may be −80 dBm while the second predetermined threshold may be −90 dBm. The predetermined time period may be in a range from five to ten milliseconds.

Alternately or additionally, determining, based on the detected location indicia, that a current location of the MTC device is different than a preceding location of the MTC device can include determining that an incoming angle of a signal received from at least one of the one or more APs is different than a previous incoming angle of a signal previously received from the at least one of the one or more APs.

Alternately or additionally, determining, based on the detected location indicia, that a current location of the MTC device is different than a preceding location of the MTC device can include at least one of determining that the location indicia includes a serial number of an AP with which the MTC device was not previously in communication during a predetermined time period or determining that the location indicia excludes a serial number of an AP with which the MTC device was previously in communication during the predetermined time period.

Returning to FIG. 3, block 304 may be followed by block 306.

In block 306, the detected location indicia are reported to a network end configured to update location information of the MTC device in response to receiving the detected location indicia. In these and other embodiments the detected location indicia may be accompanied by or may constitute a request by the MTC device to the network end to update the location information of the MTC device.

The location information of the MTC device may be stored at the network end and/or in a computer-readable storage medium accessible to the network end. Alternately or additionally, the location information of the MTC device may include data representing a sector within a coverage area of a serving AP of the MTC device. In these and other embodiments, the sector within the coverage of the serving AP may have been determined by the network end, based on the reported location indicia, to cover the current location of the MTC device.

To reduce signaling overhead compared to configurations in which MTC devices are periodically called to detect their locations, in some embodiments described herein, MTC devices are not periodically called to detect their locations. Instead, the detected location indicia may be reported by the MTC device to the network end without the MTC device being called by the network end and in response to the MTC device determining that the current location of the MTC device is different than the preceding location of the MTC device. Thus, some embodiments described herein only add signaling overhead by the MTC device initiating a location update when a location of the MTC device has actually changed. As such, communication networks, such as the communication network 100 of FIGS. 1-2, that implement some of the embodiments described herein may be able significantly reduce signal overhead per MTC device and increase the number of MTC devices that can be accommodated in the communication network compared to networks in which the network end periodically calls the MTC devices to detect their locations.

Some embodiments disclosed herein include a computer-readable storage medium having computer-executable instructions stored thereon that are executable by a computing device to perform operations included in the method 300 of FIG. 3, such as the operations illustrated by blocks 302, 304 and/or 306 in FIG. 3, and/or variations thereof. The computer-readable storage medium may be included in the MTC device and may include, for instance, the memory 212 of FIG. 2. The computing device may include the MTC device and/or a processing device thereof, such as any one of the MTC devices 102 of FIGS. 1-2, and/or the processor 210 of FIG. 2.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method of tracking device location in a communication network, the method comprising:

detecting, at a Machine Type Communication (MTC) device, location indicia from one or more access points in a vicinity of the MTC device;

determining, based on the detected location indicia, that a current location of the MTC device is different than a preceding location of the MTC device, including:

determining that a received signal strength of a signal received from at least one of one or more candidate access points is above a first predetermined threshold for a predetermined time period;

determining that a received signal strength of a signal received from a serving access point is below a second predetermined threshold for the predetermined time period; and determining that an incoming angle of a signal received from at least one of the one or more access points is different than a previous incoming angle of a signal previously received from the at least one of the one or more access point; and reporting the detected location indicia to a network end in the communication network, wherein the network end is configured to update location information of the MTC device in response to receiving the detected location indicia;

wherein the first predetermined threshold is −80 dBm, the predetermined time period is between five to ten milliseconds, and the second predetermined threshold is −90 dBm.

2. The method of claim 1, wherein the location indicia include, for each of the one or more access points in the vicinity of the MTC device, at least one of a serial number of the access point, a received signal strength of a signal received from the access point, or an incoming angle of the signal received from the access point.

3. The method of claim 1, wherein determining, based on the detected location indicia, that a current location of the MTC device is different than a preceding location of the MTC device comprises at least one of:

determining that the location indicia includes a serial number of an access point with which the MTC device was not previously in communication during a predetermined time period; or determining that the location indicia excludes a serial number of an access point with which the MTC device was previously in communication during the predetermined time period.

4. The method of claim 1, wherein the location information of the MTC device comprises data representing a sector within a coverage area of a serving access point of the MTC device, the sector being determined by the network end, based on the reported location indicia, to cover the current location of the MTC device.

5. The method of claim 1, wherein:

detecting location indicia from one or more access points in the vicinity of the MTC device is performed periodically by the MTC device with a predetermined frequency;

the MTC device comprises a static MTC device configured to remain at a fixed location for a long term or a low speed mobile MTC device configured to change locations during the long term;

the predetermined frequency is a first predetermined frequency if the MTC device comprises a static MTC device or a second predetermined frequency if the MTC device comprises a low speed mobile MTC device; and the first predetermined frequency is less than the second predetermined frequency.

6. The method of claim 1, wherein the detected location indicia is reported by the MTC device to the network end without the MTC device being called by the network end and in response to the MTC device determining that the current location of the MTC device is different than the preceding location of the MTC device.

7. A non-transitory computer-readable storage medium having computer-executable instructions stored thereon that are executable by a computing device to perform operations comprising:

detecting location indicia from one or more access points in a vicinity of a Machine Type Communication (MTC) device;

determining, based on the detected location indicia, that a current location of the MTC device is different than a preceding location of the MTC device, including:

determining that a received signal strength of a signal received from at least one of one or more candidate access points is above a first predetermined threshold for a predetermined time period;

determining that a received signal strength of a signal received from a serving access point is below a second predetermined threshold for the predetermined time period; and determining that an incoming angle of a signal received from at least one of the one or more access points is different than a previous incoming angle of a signal previously received from the at least one of the one or more access point; and reporting the detected location indicia to a network end in a communication network, wherein the network end is configured to update location information of the MTC device in response to receiving the detected location indicia;

wherein the first predetermined threshold is −80 dBm, the predetermined time period is between five to ten milliseconds, and the second predetermined threshold is −90 dBm.

8. The non-transitory computer-readable storage medium of claim 7, wherein the computing device comprises the MTC device.

9. The non-transitory computer-readable storage medium of claim 8, wherein the detected location indicia is reported by the MTC device to the network end without the MTC device being called by the network end and in response to the MTC device determining that the current location of the MTC device is different than the preceding location of the MTC device.

10. The non-transitory computer-readable storage medium of claim 7, wherein the location indicia include, for each of the one or more access points in the vicinity of the MTC device, at least one of a serial number of the access point, a received signal strength of a signal received from the access point, or an incoming angle of the signal received from the access point.

11. The non-transitory computer-readable storage medium of claim 7, wherein:

detecting location indicia from one or more access points in a vicinity of the MTC device is performed periodically with a predetermined frequency;

the MTC device comprises a static MTC device configured to remain at a fixed location for a long term or a low speed mobile MTC device configured to change locations during the long term;

the predetermined frequency is a first predetermined frequency if the MTC device comprises a static MTC device or a second predetermined frequency if the MTC device comprises a low speed mobile MTC device; and
the first predetermined frequency is less than the second predetermined frequency.

12. A communication network comprising:
a network end; and
a Machine Type Communication (MTC) device comprising a computer-readable storage medium having computer-executable instructions stored thereon that are executable by the MTC device to detect variations in a current location of the MTC device and to inform the network end to update a location of the MTC device stored by the network end in response to detecting a variation in the current location by:
detecting location indicia from one or more access points in a vicinity of the MTC device;
determining, based on the detected location indicia, that a current location of the MTC device is different than a preceding location of the MTC device, including:
determining that a received signal strength of a signal received from at least one of one or more candidate access points is above a first predetermined threshold for a predetermined time period;
determining that a received signal strength of a signal received from a serving access point is below a second predetermined threshold for the predetermined time period; and
determining that an incoming angle of a signal received from at least one of the one or more access points is different than a previous incoming angle of a signal previously received from the at least one of the one or more access points; and
reporting the detected location indicia to the network end, wherein the network end is configured to update location information of the MTC device in response to receiving the detected location indicia;
wherein the first predetermined threshold is −80 dBm, the predetermined time period is between five to ten milliseconds, and the second predetermined threshold is −90 dBm.

13. The communication network of claim 12, wherein the communication network comprises one of: a Third Generation Partnership Project Long Term Evolution (3GPP LTE) network, a Global System for Mobile Communications (GSM) network, or a Universal Mobile Telecommunications System (UMTS) network.

14. The communication network of claim 12, wherein the network end comprises a Mobility Management Entity (MME).

15. The communication network of claim 12, further comprising a carrier to which the MTC device is coupled.

16. The communication network of claim 15, wherein the carrier comprises an intelligent ammeter.

17. The communication network of claim 15, wherein the carrier comprises a security monitor.

18. The communication network of claim 15, wherein the carrier comprises a parking meter.

19. The communication network of claim 15, wherein the carrier comprises a vending machine.

20. The communication network of claim 15, wherein the carrier comprises an elevator.

21. The communication network of claim 15, wherein the carrier comprises a pump.

22. The communication network of claim 15, wherein the carrier comprises a car.

23. The communication network of claim 15, wherein the carrier comprises a container.

24. The communication network of claim 15, wherein the carrier comprises a pet.

* * * * *